G. M. STEVENSON.
BODY FORMING MACHINE FOR PRODUCING SANITARY CANS.
APPLICATION FILED JAN. 12, 1920.

1,436,548. Patented Nov. 21, 1922.
13 SHEETS—SHEET 1.

WITNESSES
Howard D. Orr
H. T. Chapman

George M. Stevenson, INVENTOR,
BY
ATTORNEY

G. M. STEVENSON.
BODY FORMING MACHINE FOR PRODUCING SANITARY CANS.
APPLICATION FILED JAN. 12, 1920.

1,436,548. Patented Nov. 21, 1922.
13 SHEETS—SHEET 8.

George M. Stevenson, INVENTOR,

WITNESSES
Howard D. Orr.
F. J. Chapman.

BY

ATTORNEY

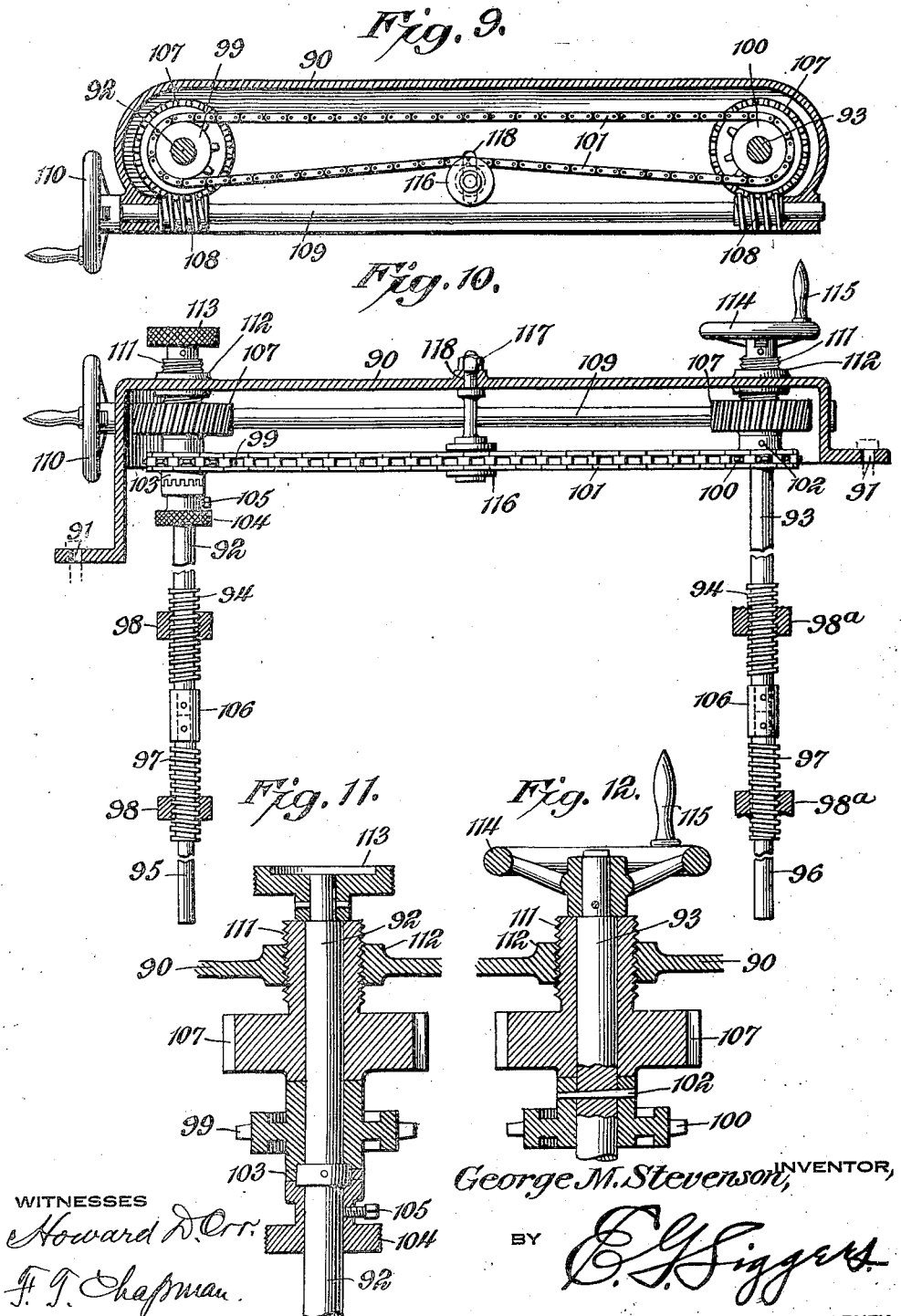

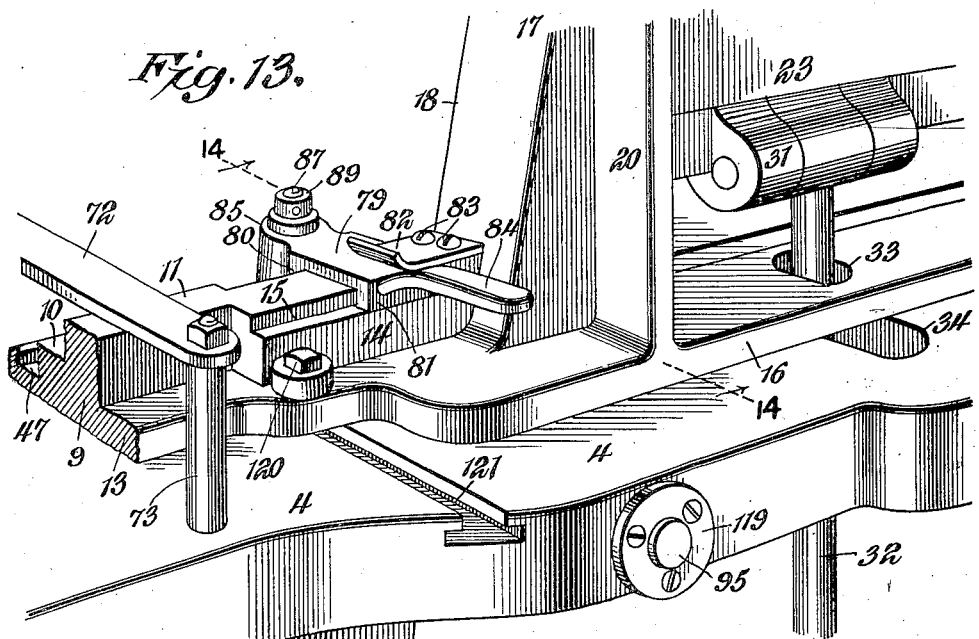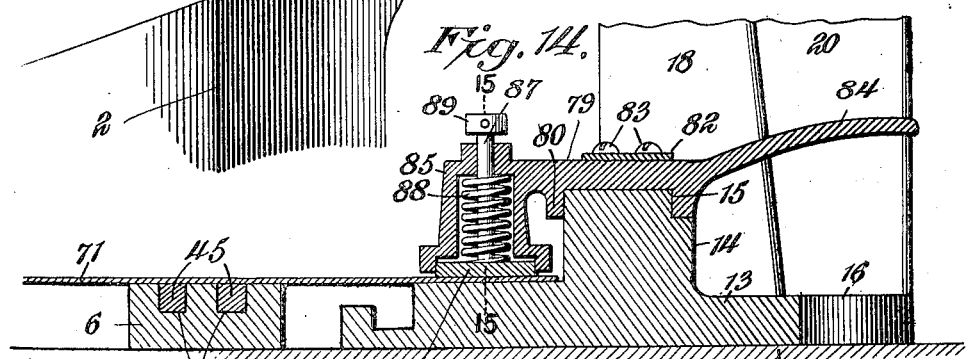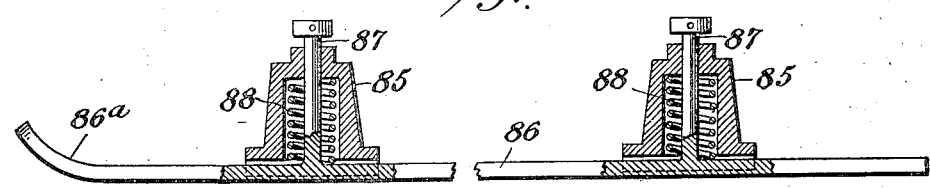

G. M. STEVENSON.
BODY FORMING MACHINE FOR PRODUCING SANITARY CANS.
APPLICATION FILED JAN. 12, 1920.
1,436,548.
Patented Nov. 21, 1922.
13 SHEETS—SHEET 11.
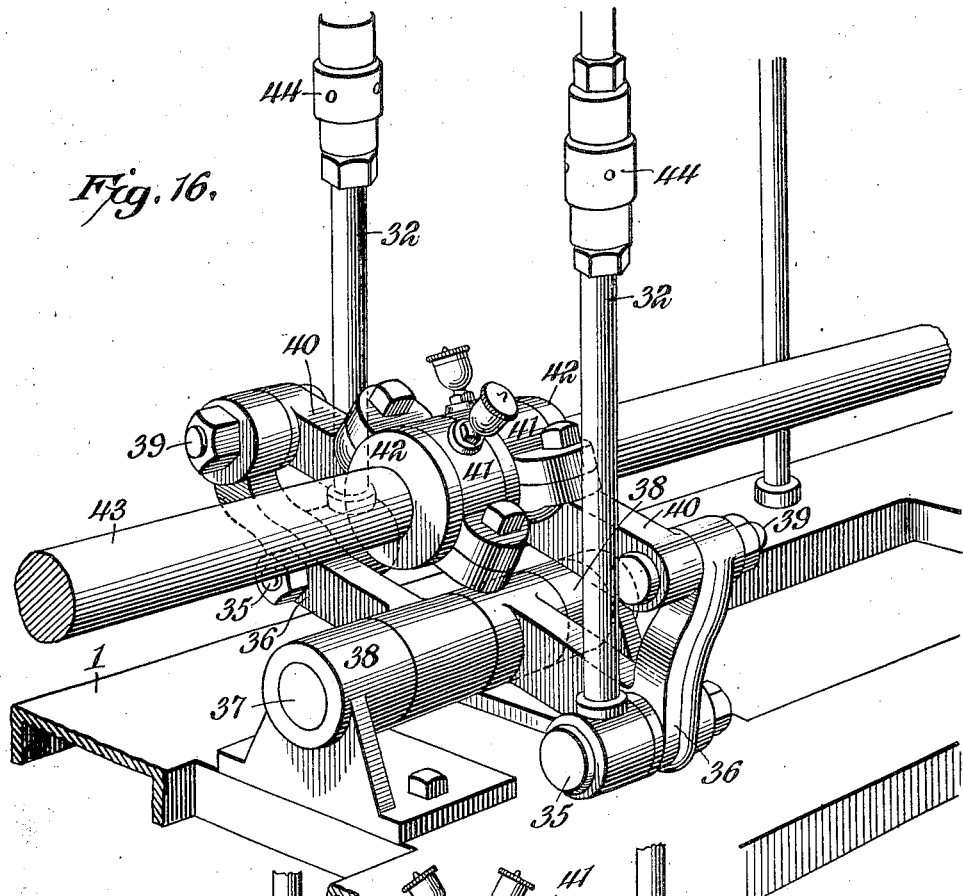
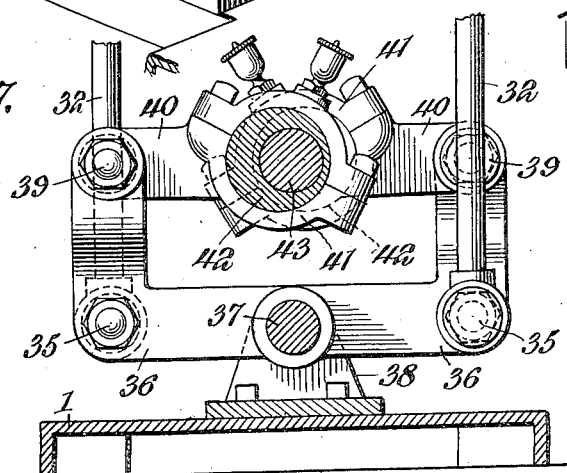
WITNESSES
Howard D. Orr.
H. T. Chapman.
INVENTOR,
George M. Stevenson,
BY
E. G. Siggers.
ATTORNEY

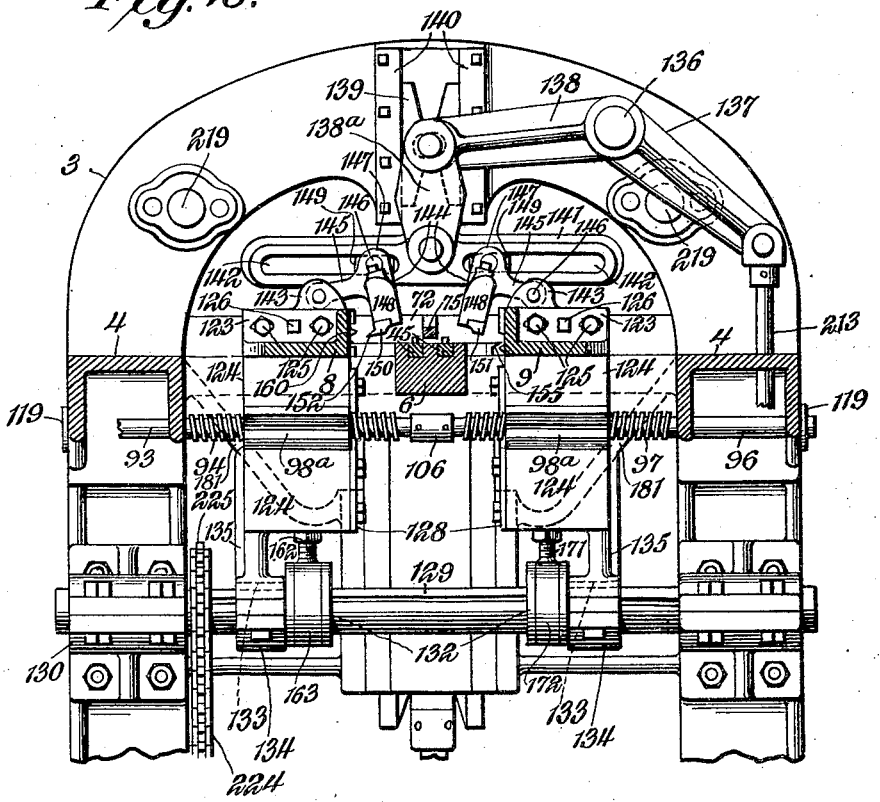

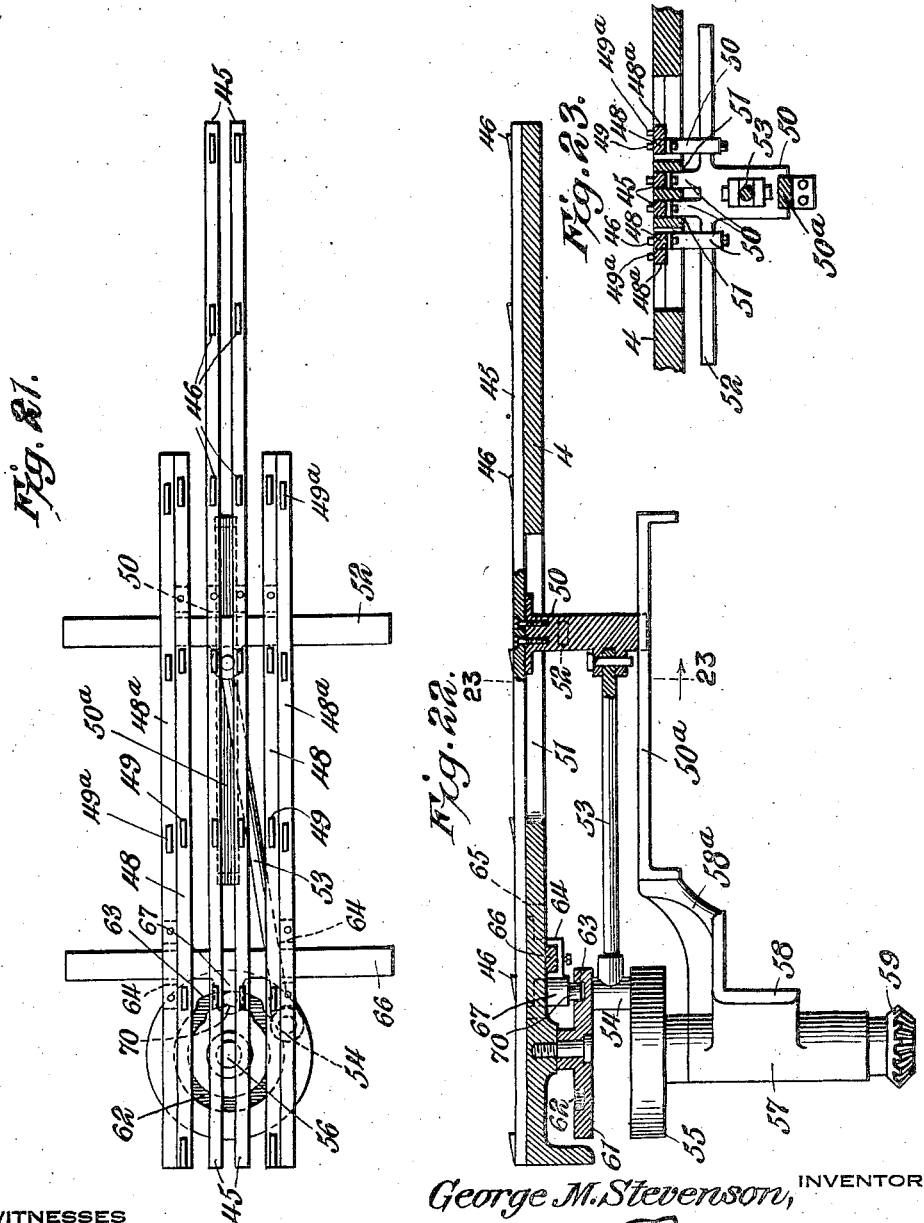

Patented Nov. 21, 1922.

1,436,548

UNITED STATES PATENT OFFICE.

GEORGE M. STEVENSON, OF BALTIMORE, MARYLAND.

BODY-FORMING MACHINE FOR PRODUCING SANITARY CANS.

Application filed January 12, 1920. Serial No. 350,883.

*To all whom it may concern:*

Be it known that I, GEORGE M. STEVENSON, a citizen of the United States, residing at Baltimore city, in the State of Maryland, have invented a new and useful Body-Forming Machine for Producing Sanitary Cans, of which the following is a specification.

This invention has reference to body forming machines for producing sanitary cans, and its object is to provide a machine in which certain objectionable features of other body forming machines are avoided.

The invention comprises a machine in which sheets of tin plate, which is the material usually employed, are fed into and caused to progress through the machine, such sheets constituting blanks of appropriate size to be ultimately formed into open-ended cylinders with the meeting edges joined and ready to receive caps or ends. During the time the blank is passing through the machine, the opposite edges are suitably shaped for ultimate interlocking.

The invention comprises means whereby the blank fed into the machine moves through the latter intermittently with periods of rest during which the corners of the blank, which is of rectangular form, are clipped off, this operation being termed notching, so that when the blank is formed into a cylinder and the meeting edges are interlocked, the end portions of the can are not thickened by excess layers of the tin and hence the can caps or heads may be readily and properly applied.

After entering the machine and passing through the notching zone, each blank is fed forwardly to enter the zone in which those edges of the blank constituting the meeting edges in the can are bent over so that when brought together they will interlock, this operation being termed edging. Finally the notched and edged blank, in its travel through the machine, is fed to a horn about which the blank is bent into cylindrical form, and after the meeting edges are interlocked and hammered tight, the finished cylinder is discharged from the machine.

The invention contemplates feeding means for causing the progressive movement of the blank through the machine with each complete step made up of a long and a short step, the long step being but little short of the complete step so that the momentum imparted to the blank by the long step will not cause the blank to override the length of the complete step but stop short thereof, whereupon a slight impulse is imparted to the blank sufficient to complete the step without giving to the blank sufficient momentum to pass beyond the limits of the complete step. The second impulse given to the blank need move it but a fractional portion of an inch, say about one quarter of an inch.

The invention also contemplates means whereby the machine may be adjusted to take blanks of different widths, adapting the machine to the production of headless can bodies of different sizes with the parts so constructed that the adjustment is accomplished in much less time than has heretofore been found necessary for the purpose.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figures 9, 10, 11 and 12 are sectional views of parts of the adjusting mechanism for setting the machine for different widths of can blanks, such mechanism appearing particularly in Figures 2 and 8.

Figure 13 is a perspective view, on a larger scale than other views, of a presser bar structure.

Figure 14 is a section on line 14—14 of Figure 13.

Figure 15 is a section on the line 15—15 of Figure 14.

Figure 16 is a perspective view, on a larger scale than certain of the other figures, of a cam and rocker mechanism forming part of the machine and forming part of the notching mechanism.

Figure 17 is an elevation of the cam and rocker mechanism showing one of the cams in cross section.

Figure 18 is a section on the line 18—18 of Figure 1, with some distant parts omitted.

Figure 19 is a detail section showing a cam arrangement for fine adjustment of certain parts.

Figure 20 is a cross section of a portion of the edger mechanism with parts omitted.

Figure 21 is a plan view of the feeding bar arrangement for the can blanks.

Figure 22 is a longitudinal vertical section of the structure shown in Figure 21.

Figure 23 is a section on the line 23—23 of Figure 22.

Figure 1:
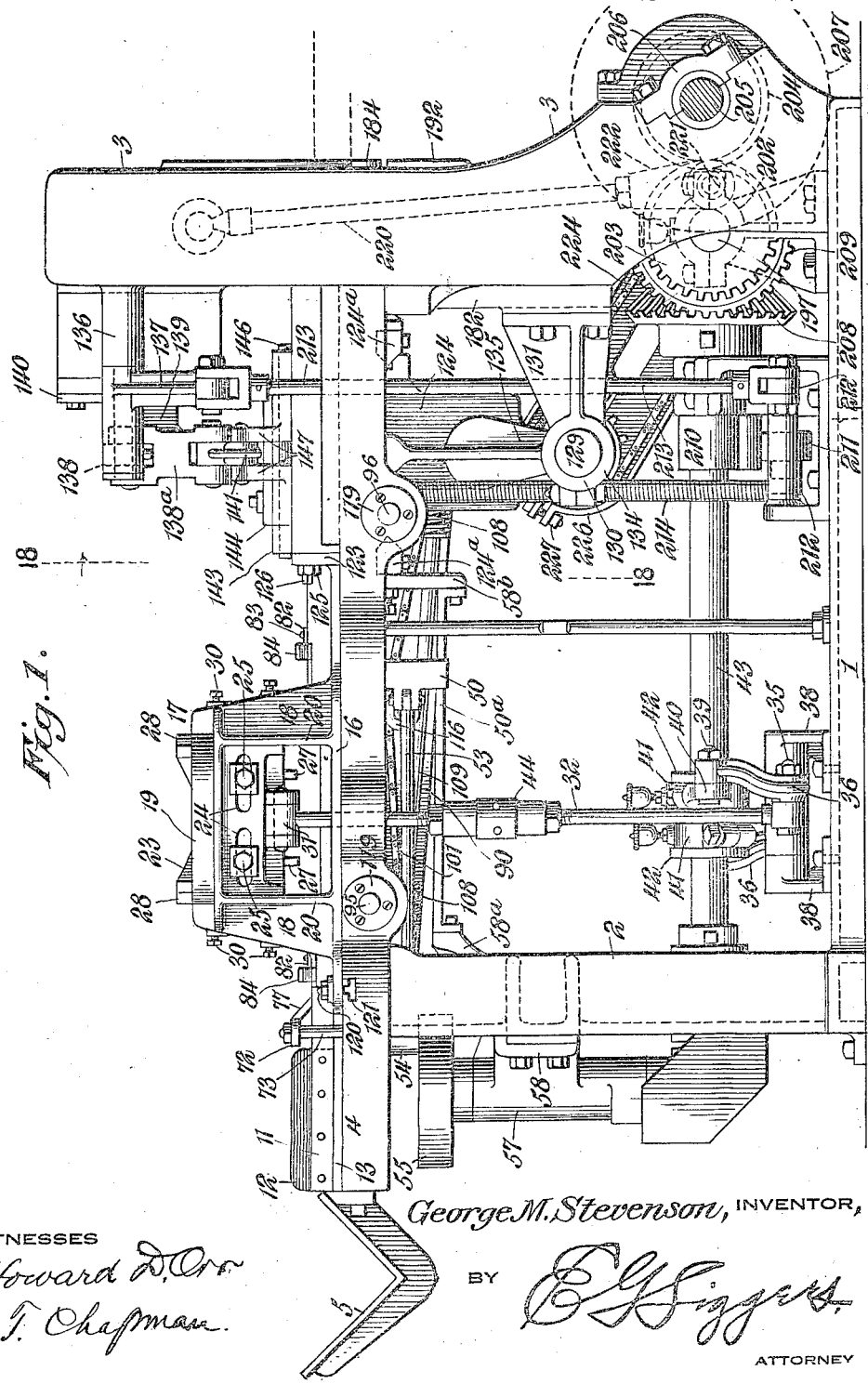
Figure 1 is an elevation of one side of a machine embodying the invention.
Figure 2:
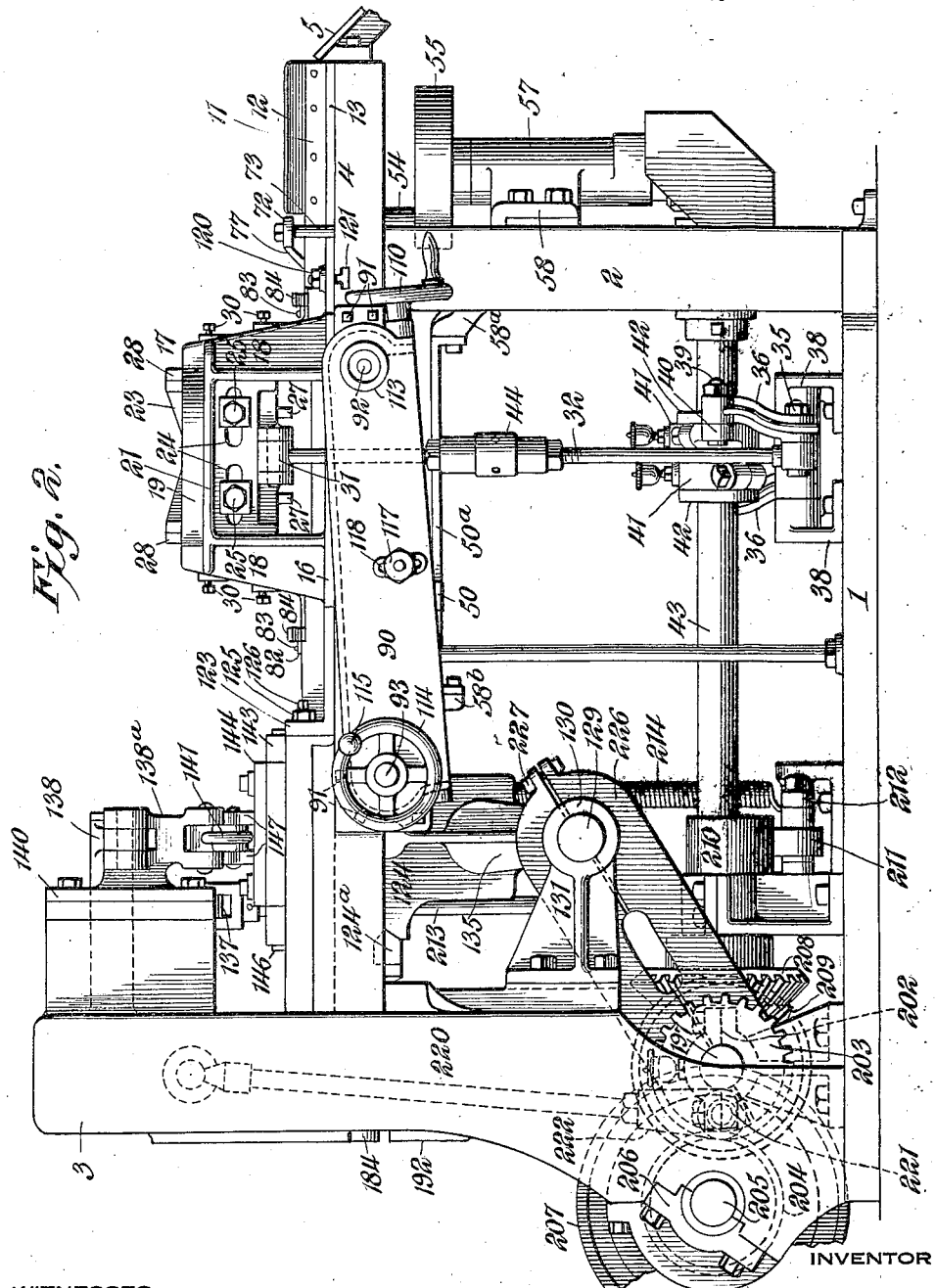
Figure 2 is an elevation of the opposite side of the machine.
Figure 3:
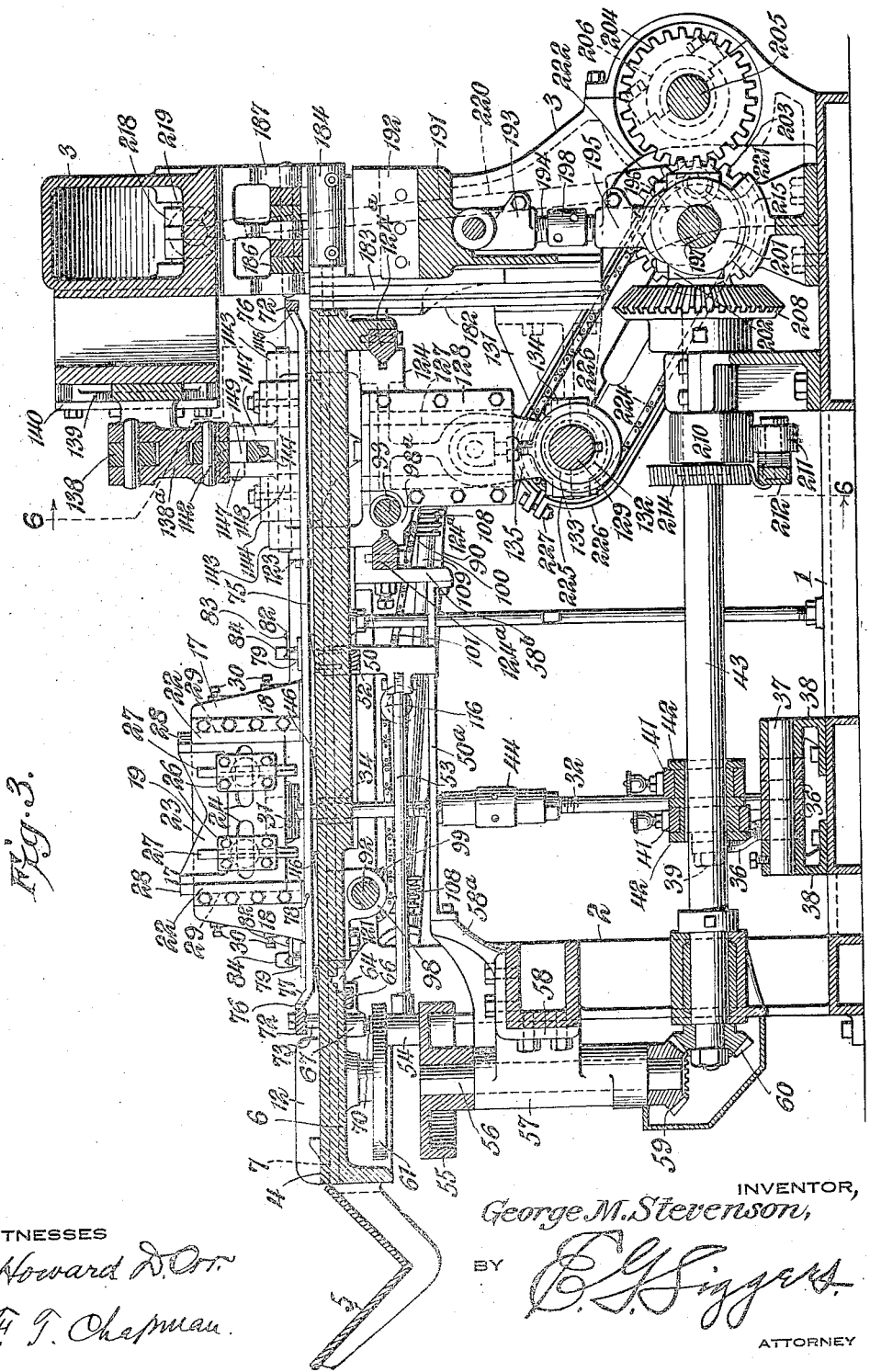
Figure 3 is a vertical longitudinal section of the machine.
Figure 4:
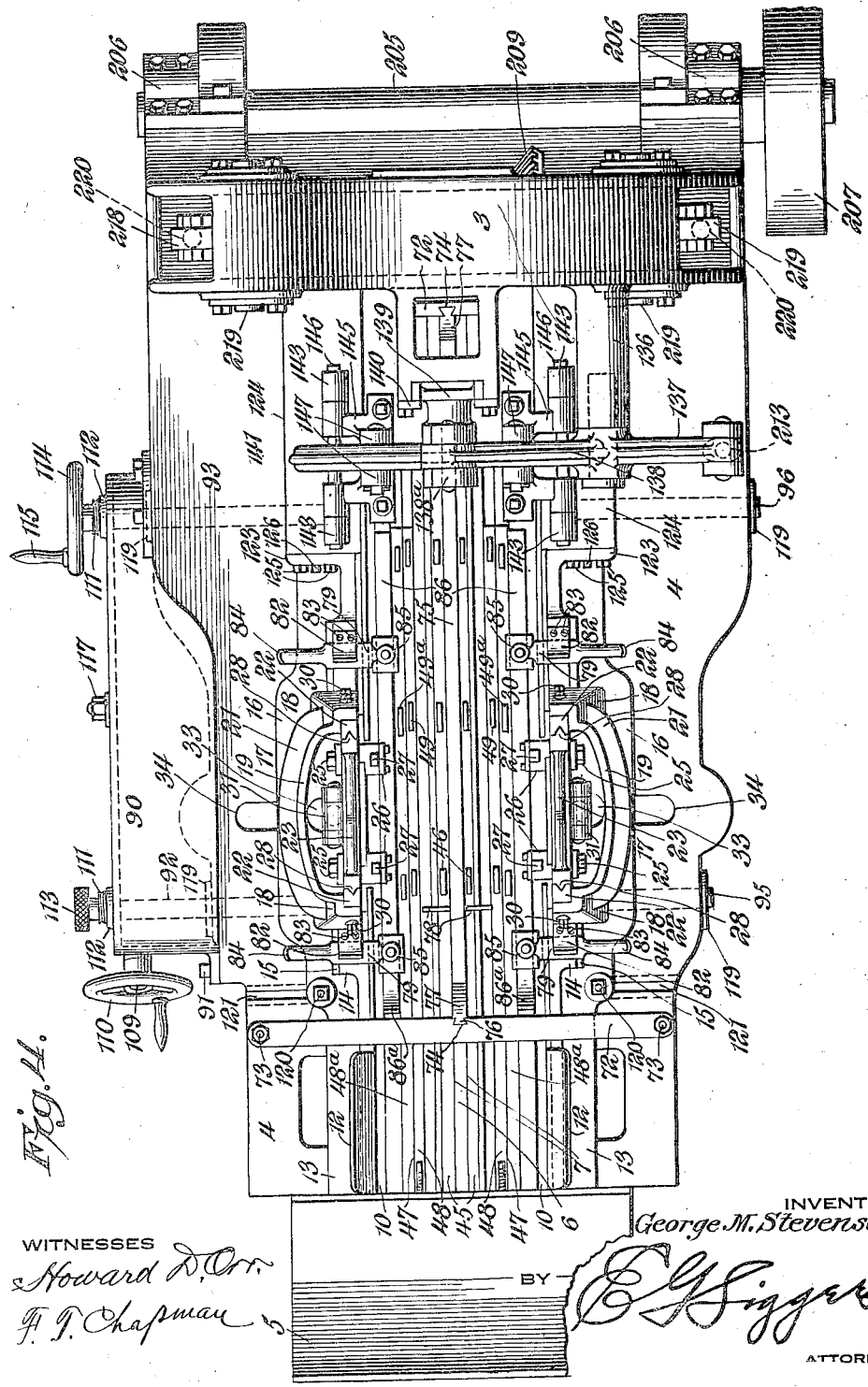
Figure 4 is a plan view of the machine.
Figure 5:
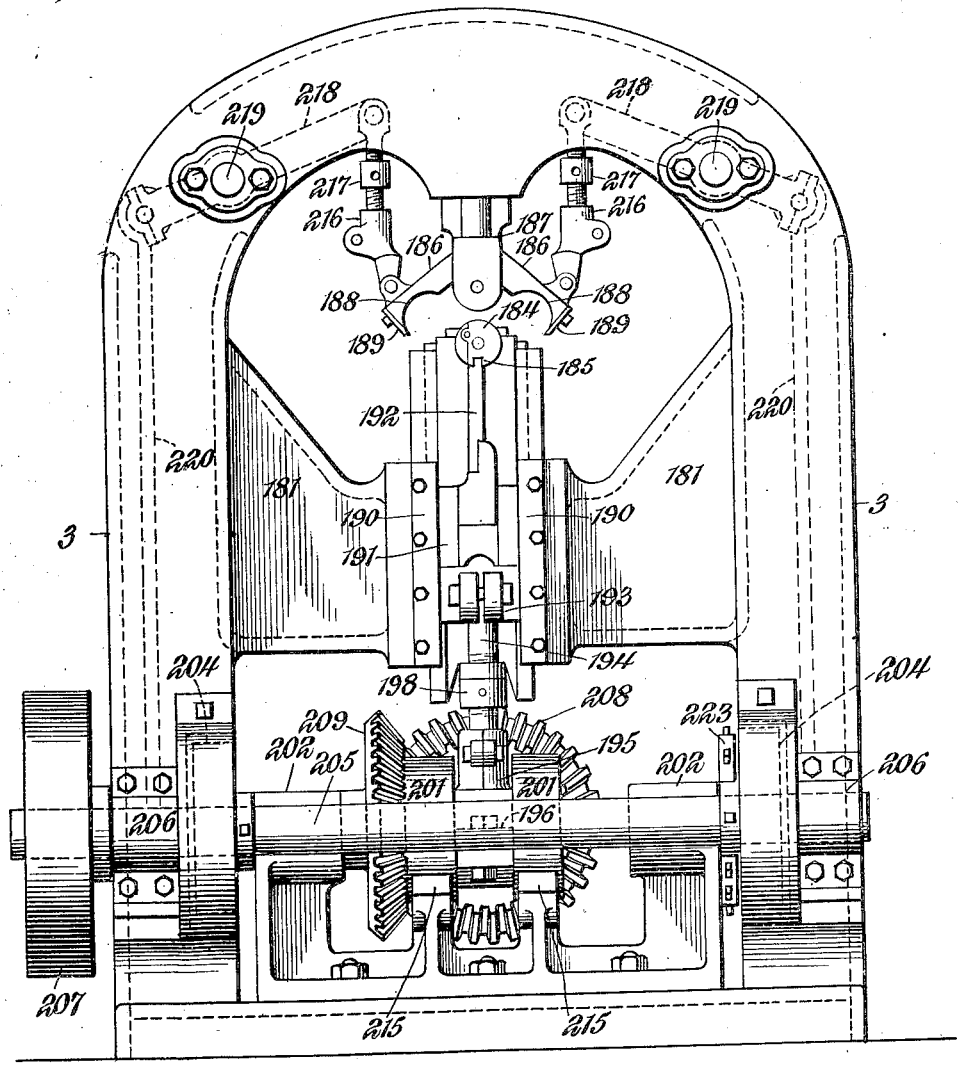
Figure 5 is a rear elevation of the machine, distant parts being omitted.
Figure 6:
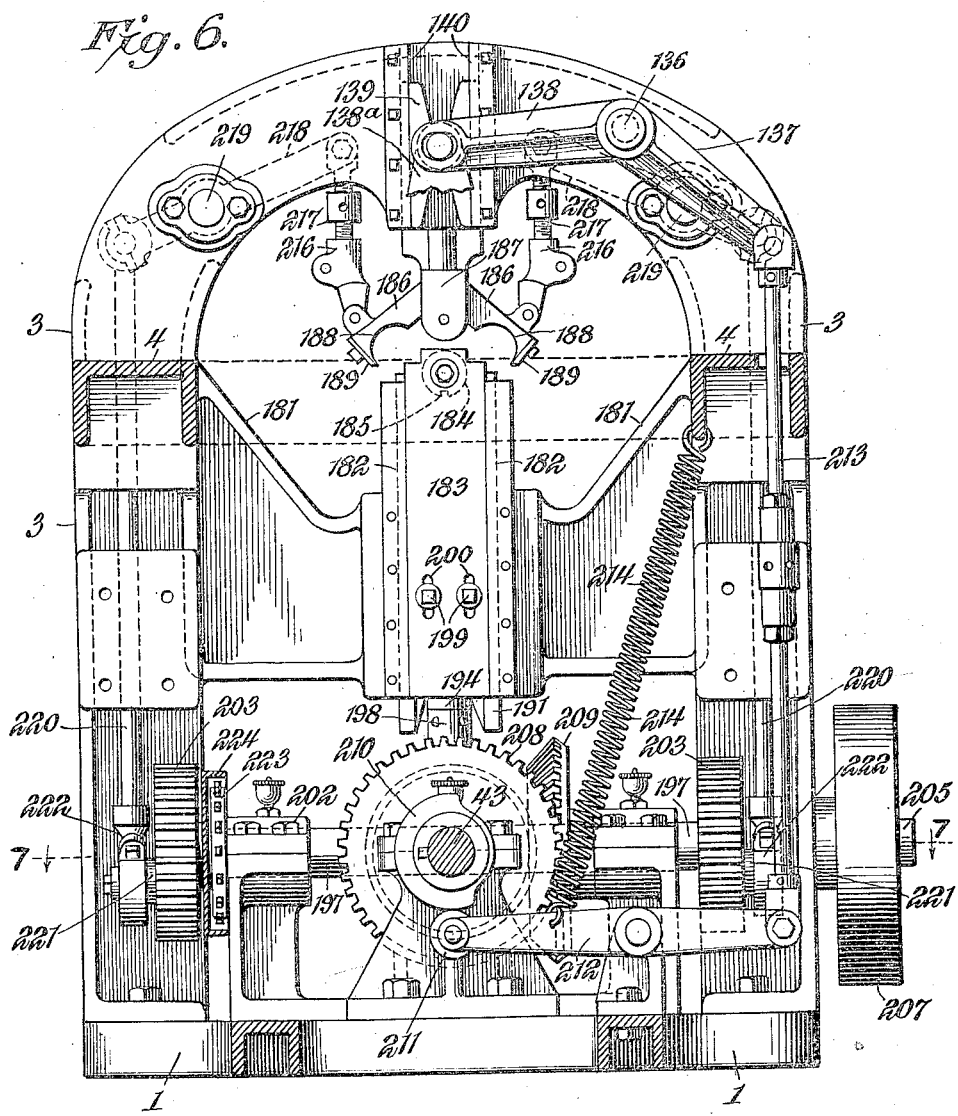
Figure 6 is a section on the line 6—6 of Figure 3.
Figure 7:
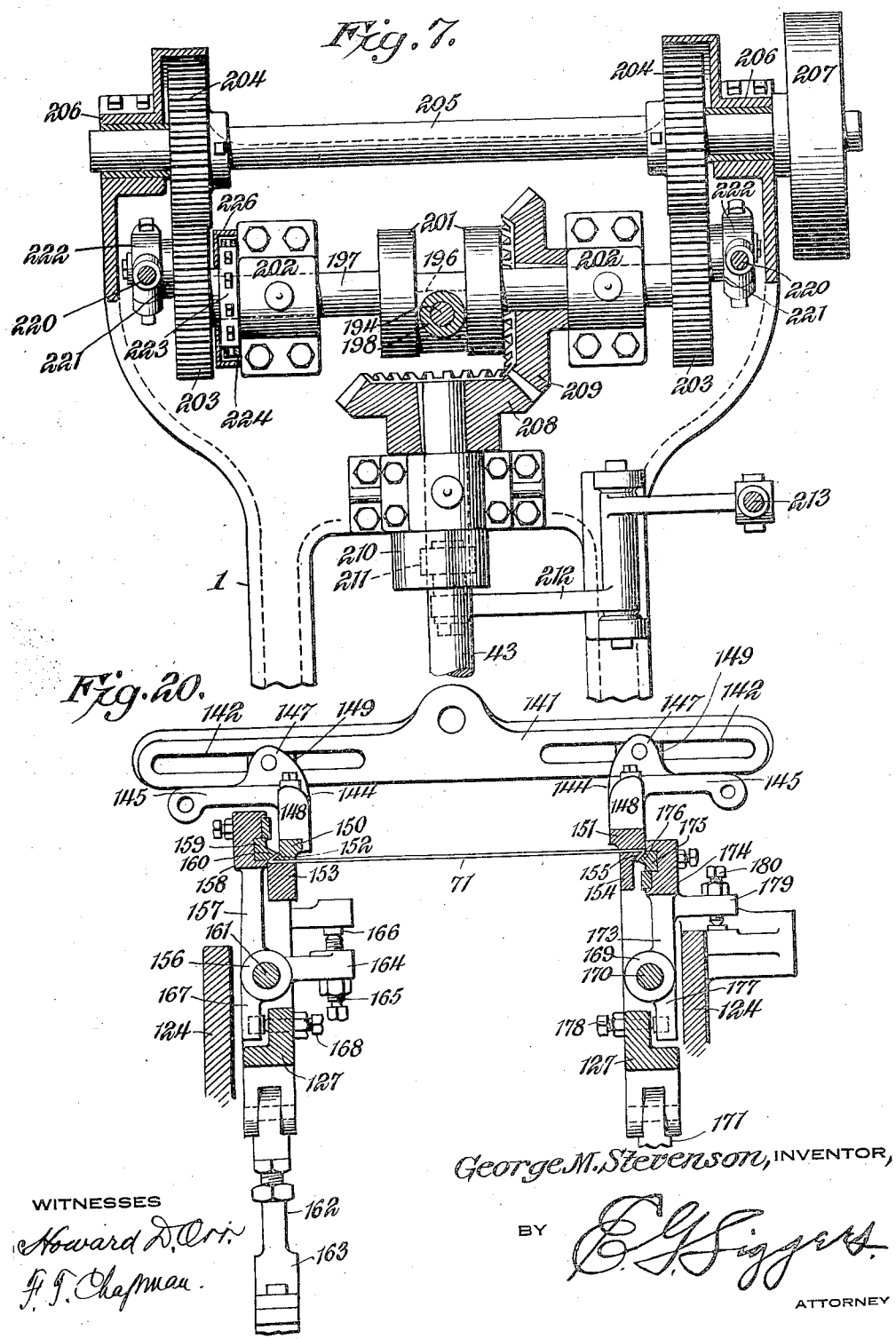
Figure 7 is a section on the line 7—7 of Figure 6.
Figure 8:
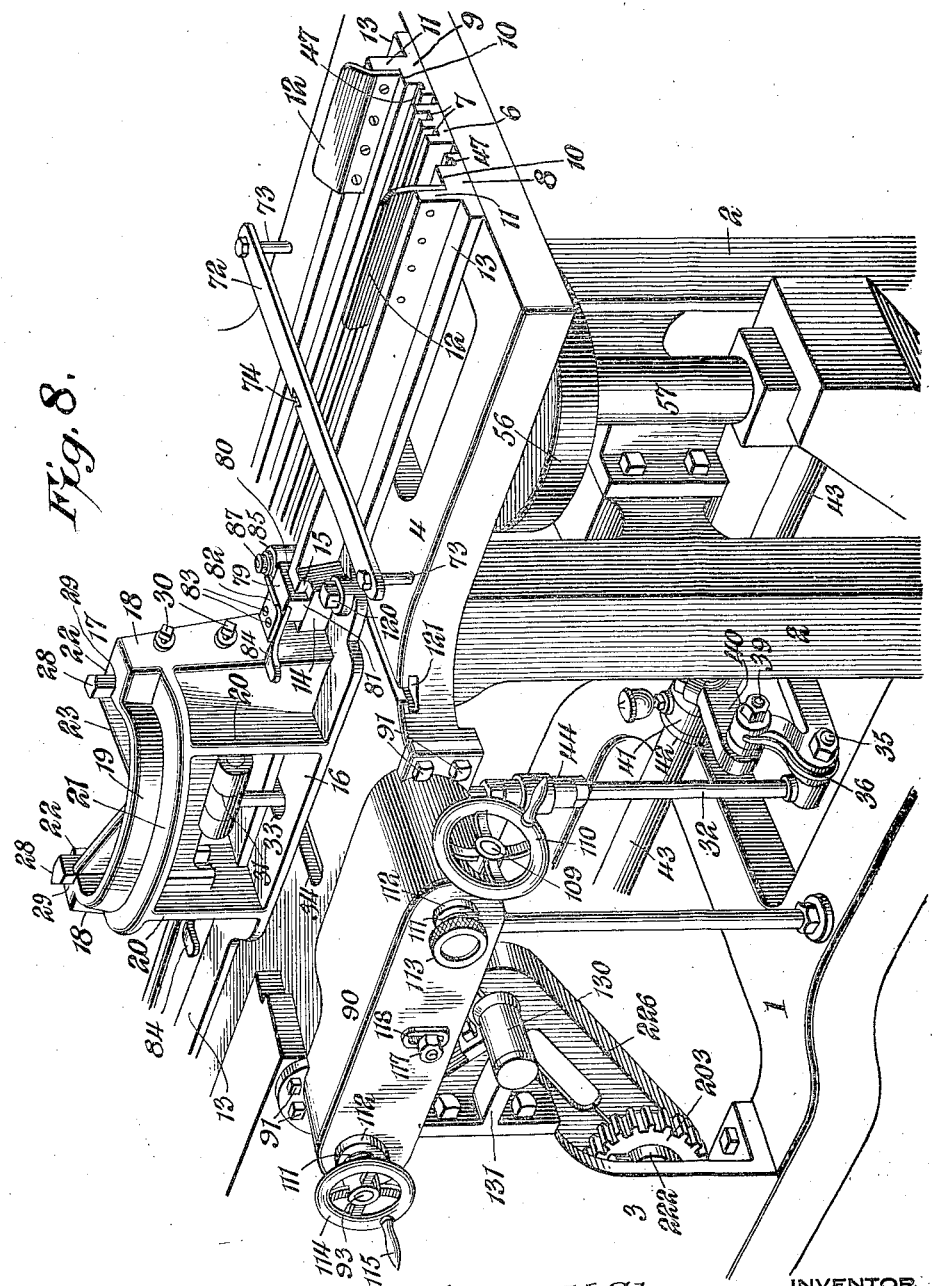
Figure 8 is a perspective view of a portion of the machine as seen in Figure 2, showing means for adjusting parts for the production of can bodies of different sizes.

Referring to the drawings, there is shown a base plate 1, end frames 2 and 3, respectively, and a top or table 4. These several parts may be in the form of castings of more or less open web-and-flange construction and designed to carry various mechanisms making up the working parts of the machine.

At one end of the machine, which, because it is the receiving end, may be termed the front end, there is secured a hopper 5 suitably shaped to receive a supply of blanks to be fed into the machine, such feeding being usually by hand. The blanks are of generally rectangular form of a width corresponding to the height of the can body to be produced, and of a length somewhat greater than the circumference of the finished can body to provide for the overlapping and interlocking of the meeting edges of the blank. The cans for which the machine is designed, may be considered as made of tin plate and the blanks are cut to size before being fed into the machine.

From the hopper the blanks are fed one at a time into the entering or feeding end of the machine and each blank is there engaged by intermittently acting one-way feeding mechanism arranged to propel the blank by the edge remote from that advancing into the machine. The feeding mechanism is so arranged as to move the blank through the machine by successive steps, with each step comprising a stroke slightly shorter than that dimension of the blank representing the height of the can, followed immediately by a short stroke representing but a fraction of an inch, with the two strokes together making up a full feeding step of movement of the blank through the machine. Such combined long and short strokes are provided to prevent overriding of the can blank, for, in operation, the travel of the blank through the machine is rapid, and there is liability, should the full movement be accomplished in one stroke of the can blank, of overriding the limit of travel and so interfering with the proper operation of the machine upon the can blank.

After the blank has been moved a suitable distance into the machine, it is brought to a temporary standstill in operative relation to a mechanism which is termed a notcher, this mechanism severing small corner portions from the blank, so that the latter may be ultimately formed into a can body, which is of cylindrical shape with the meeting edges locked together, without the ends of the can where the heads are applied being of undue thickness. If the corners of the blank were not cut off, the seam would have throughout its length a thickness of four layers of sheet metal, thus greatly interfering with the proper application of the head of the can. By treating the blank, in the notching zone, in its movement through the machine, such excessive thickness is avoided. Following the notching, the travel of the blank through the machine is resumed and continued until another zone, termed the edging zone, is reached, the propulsion of the blank being by long and short strokes, as before, and the blank is then acted upon by edging mechanism. This results in those edges of the blank afterward joined together to produce a longitudinal seam, being properly bent over. The progressive movement of the blank through the machine is then resumed until the blank is brought into operative relation to a horn about which the blank is folded by appropriate mechanism and the edges are forced together into intimately locked relation, after which the completed can body in condition to receive the heads is discharged from the machine.

On the table 4 is a longitudinal bar 6 extending rearwardly from the forward or feeding end of the table through approximately the longitudinal upright center plane of the table. This bar is provided in its upper surface with longitudinal grooves 7 opening through the top surface of the bar for the greater portion of the length of the machine so as to include the entering, notching and edging zones. On opposite sides of the bar 6 are other bars 8, 9, respectively, each having a ledge 10 on a level with the top surface of the bar 6. The bars 8, 9 have upstanding flanges or ribs 11, which, at the entering end of the machine, have fenders or wings 12. These wings rise above the flanges 11 and there flare outwardly to form entering guides facilitating the placing of the blanks into the blank runway. The bars 8, 9 have outstanding longitudinal basic flanges 13 resting on and adjustable crosswise of the table or top 4.

At a point sufficiently back of the entering or feeding end of the machine, each bar 8, 9 has the flange 11 laterally expanded, as indicated at 14, with the outer edge rabbeted for a distance lengthwise, as shown at 15, these parts being particularly indicated in Figure 13 and also appearing in part in Figure 14.

At the rear of the expanded part 14, the flange 13 is also laterally expanded as shown at 16. Rising from each bar 8, 9 at the expanded part 16 of the flange 13 is a frame 17 formed of upright end posts 18 joined and strengthened by webs 19, 20, 21, all of which may be cast integral with each other and with the flange 16 and constitute a portion of a blank notching mechanism designed to clip off the corners of the blank on the latter reaching such notching mechanism, or notcher, in the course of travel of the blank through the machine.

The posts 18 of each notcher member on opposite sides of the machine are provided with upright guides 22 in which is mounted a carrier 23 capable of up and down movements. The carrier 23 has slots 24 extending lengthwise of the machine to pass bolts or screws 25 clamping cutter holders 26 in adjusted positions to the carrier 23. Mounted in each cutter holder 26 is a cutter or punch 27 properly shaped to punch or shear a corresponding corner from a blank when located in operative relation to the notcher.

Opposite edge portions 28 travel in upright tracks 29 in the form of V-shaped grooves in the particular showing of the drawings, with which tracks suitable take-up devices are associated to compensate for wear. Such compensating means are not shown except that the customary adjusting screws therefor are indicated at 30.

Connected by a hinge 31 to each carrier or slide 23 is a pitman 32, extending downwardly through a slot 33 crosswise of the flange 16 and another slot 34 crosswise of the table 4 where overridden by the notcher mechanism. Each pitman 32 is dropped to the base 1 and is there pivoted by a bolt or stud 35 to the intermediate portion 36 of a corresponding angle rock lever fulcrumed at one end upon a pin 37 mounted to rock in bearings 38 fast to the base 1 and at the other end connected by a pivot bolt 39 or in other suitable manner to one end of an arm 40. The other end 41 of the arm 40 is in the form of a yoke embracing a cam 42 mounted on a shaft 43 extending lengthwise through the machine and constituting a transmission shaft. There are two such cams 42 with the connections between the pitmen 32 and the cams 42 duplicated so that the shaft 43 may drive both pitmen 32 and cutters or notching tools 27 on opposite sides of the path of the blank through the machine. In order to adjust the stroke of the notcher structure with reference to the blanks, provision is made for adjusting the length of each pitman 32 by including in the pitman a turn-buckle 44 which may be of ordinary construction and therefore needs no special description.

Mounted to reciprocate along the grooves 7 of the bar 6 are feed or push bars 45 each having elastically yieldable dogs or abutments 46 with the top surface inclined in the direction of feed, each abutment being normally urged to project a short distance above one end of a can blank placed upon the surface of the bar 6 and resting on the ledges 10 of the bars 8 and 9. Each bar 8 and 9 between the ledge 10 and the adjacent side of the bar 6 is formed with a longitudinal groove 47 to receive a bar 48 similar to a bar 45 and like the bar 45 provided with yieldable abutments or dogs 49. The grooves 47 also receive other bars 48ª like and alongside of the bars 48 and provided with abutments or dogs 49ª.

In the travel of a blank through the machine, such travel is progressive but intermittent, each complete stroke being such as to carry the blank through a zone, in some of which zones the blank is acted upon by certain mechanisms to ultimately form the blank into an open-ended can body of cylindrical form with the meeting edges overlapped and locked. In the progress of the blank through the machine, forward movements only occur to the blank at certain points, such movements being needful to carry the blank, being formed into a can body, from one operative zone to another and at the same time providing sufficient room to permit the location of mechanisms used in causing the different operations. At other points the blank is shaped in various ways.

The push bar abutments 46, 49 are intended to engage one edge of each can blank, this being the rear edge in the direction of travel of the blank through the machine, and the full forward movement of the abutment, is limited to a distance a little short of that which would be necessary to propel the blank through one full step, which full step may be considered to be as long as the can body produced from the blank. Such shortening of the movement of the push bar abutment is to prevent the momentum imparted to the can blank from causing the latter to override the particular zone through which the can blank is pushed. Such shortening of the travel of the can blank in moving it from one operative position to another causes the can blank to stop before it has quite reached the desired position, and therefore the additional push bars 48ᵃ are provided to impart a short, slight impulse to the blank but sufficient to carry it to the limit of the stroke ready for action upon the blank in accordance with the zone in which it is then located. Each complete feeding movement is therefore represented by the sum of two movements, the first including a movement but a little short of the full movement and the second completing the full movement or stroke. It would be extremely difficult, if not impossible, or at any rate would require complex mechanism, to move the can blank with great rapidity through the machine and intermittently stop the movement without causing the can blank to override the proper location. This difficulty, however, is overcome by dividing the full stroke into a long part nearly equal to the full stroke and a short part which in practice may represent but a fraction of an inch. On account of the function of the bars 45, 48 and 48ᵃ, the bars 45 and 48 are designated push or feed bars, while the bars 48ᵃ are termed registering bars since they serve to finally move the blanks into the final or registering position for each complete stroke, the stopping of the blank being caused frictionally.

In order to impart intermittent reciprocatory movements to the bars 45 and 48, with these movements properly timed and of the proper length, each bar 45 and 48 has secured to it a block 50 extending through a slot 51 in the table 4 to a point below said table, the slot being extended longitudinally of said table. The blocks 50 of the bars 45 are connected together by a cross rod 52, from which rod the blocks 50 of the bars 48 are readily detached. One of the blocks 50, say the intermediate one, which may be a double block, is connected by a pitman 53 to a wrist pin 54 on a disk 55 on the upper portion of an upright shaft 56 mounted in journal bearings 57 carried by a bracket 58 made fast to the forward end frame 2 of the main frame of the machine. The bracket 58 has a continuation 58ᵃ carrying a guide 50ᵃ on which the intermediate block or blocks 50 are supported in their reciprocatory movements. The lower end of the shaft 56 carries a bevel pinion 59 meshing with another bevel pinion 60 in the corresponding end of the shaft 43. Mounted on the under face of the table 4 above the disk 55 is another disk 61 between which and the disk 55 the wrist pin 54 extends. The disk 61 is thereby made fast to and rotates with the shaft 56, and in its upper face the disk 61 contains a continuous groove 62 in which, at an appropriate point, there is a cam offset 63. The bars 48ᵃ are each fastened to a block 64 individual thereto and each extending through a longitudinal slot 65 in the table 4 of the main frame, the blocks 64 being connected together by a rod 66 so as to move simultaneously. To actuate the bars 48ᵃ there is provided a short arm 67 connected at one end to the block 64 carrying the connecting rod 66. The arm 67 carries a roller 70 engaging in the cam groove 62.

When the shaft 56 is rotating, the disks 55 and 61 are likewise rotated. The rotation of the crank disk or plate 55 imparts a reciprocation to the bars 45 but a little short of the full distance of each complete stroke to be imparted to a can blank and when the maximum of travel of the can blank under the action of the rods 45 is reached, it is engaged by the rods 48, and, because of the small motion given to these rods by the short offset cam portion 63 of the groove 62, there is imparted to the can blanks a very short additional movement with such little momentum that they will come to rest at once and will not override the full limit of movement intended even to a minute extent.

When the travel of the push or feed bars is occurring, the other parts of the machine are so timed as to remain quiescent so far as action on a blank itself is concerned. While the feed bars are being retracted, the notching, the edging and the folding and locking mechanisms are active, so that at the termination of such period the machine contains a blank just introduced, another blank in front of it with the corners clipped off, still another blank in front of the second-named blank with opposite edges bent, one upwardly and the other downwardly, and another blank rolled up into cylindrical form about an appropriate horn with the bent edges brought together, interlocked and hammered down. When the forward movement is progressing, a completed can body, so far as the machine is concerned, is ejected from the machine by the next succeeding blank in order.

In the commercial machine, there may be a plurality of blanks, say, two or three, which pass through certain inactive zones included in the machine, because the necessary operating mechanism takes up so much space lengthwise of the machine as to necessitate some additional length not provided by the active zones.

As the blanks, a portion of one of which is shown at 71 in Figure 14, travel through the machine in end to end relation in the direction of travel, they are held down upon the top of the bar 6 and the ledges 10 of the bars 8 and 9 and override the push and registering bars 45, 48, 48ᵃ, as they progress through the machine, finally leaving these parts when reaching the horn and while being acted upon by the mechanism for bending the blank about the horn and finishing the locking of the meeting edges.

The central portion of each blank is held against the feed and registering bars by gravity. To accomplish this, cross bars 72 traverse the path of travel of the blanks in elevated relation thereto, being upheld by end posts 73 erected on the top of the table 4 so as to overhang the latter to a sufficient height. These end bars occur at a point a short distance to the rear of the feeding end of the machine and at another point to the rear of the edging portion of the machine. Each bar 72 is provided on the edge toward the other bar with a notch or recess 74 preferably of dove-tail form and the notches are designed to hold the end portions of an elongated gravity bar 75 having dove-tail tongues 76 at the ends with the forward end 77 of the bar rising so that the bar may bear upon the blanks as they travel through the machine and hold them onto the bars 45 and 48. The gravity bar 75 is provided with laterally-projecting handles 78 by means of which the gravity bar 75 may be lifted from the machine when it is desired to reach parts over which the gravity bar is located.

Mounted on the expanded part of each flange 11 is a slide 79 having side tongues 80, 81 on opposite sides of and embracing the upper portion of the expanded part 14 of the flange 11. The slide is held on the expanded part of the flange 11 by means of a spring leaf 82 held to the expanded part 14 by screws 83 or otherwise, the arrangement being such that the slide may be placed upon the expanded part 14 forward of the spring 82 and then pushed rearwardly so that the spring will override the slide and thereby hold it firmly but removably in place. At one side the slide 79 is provided with a manipulating handle 84 and at the other side, that is toward the center line of the machine, the slide carries a socket 85 projecting downwardly toward the table 4. The socket carries a runner 86 on the lower end of a stem 87, said runner having a forward upturned toe 86ª, and within the socket the stem is surrounded by a spring 88 tending to move the runner 86 against a blank 71 when beneath it. A head 89 fast to the stem 87 outside of the socket serves to limit the movement of the runner 86 under the expansive effect of the spring 88. The runner 86, therefore, serves as an elastic or yieldable friction element bearing against the blank 71 holding it against the surface along which it travels but with insufficient force to prevent such travel. By means of the elastically yieldable runners 86 and the gravity bar 75, the blanks 71 are held flat against the bar 6 and the ledges 10.

There is a pair of sockets 85 with slides 79 individual thereto on each side of the blank runway or path of travel, one socket of each pair being located near the front end of the notcher structure and the other being located at a point to the rear of the notcher structure, while the runner 86 is elongated into a shoe long enough to extend in front of one slide and to the rear of the other slide of the same pair. This provides a long bearing for engaging the corresponding portions of a succession of blanks 71 and holding them down upon the support formed by the bar 6 and ledges 10.

To provide for the adjustment of the feeding path for different sizes of cans, the larger sizes requiring greater widths and the small sizes narrower widths, the invention includes mechanism whereby the two sides of the feeding path may be caused to approach or recede simultaneously to equal extents, parallelism being maintained, or for some purposes one side may be adjusted without affecting the other side. This last adjustment is particularly important, since in completing the joint by hammering the meeting edges together, the layers of tin where overlapping must accurately enter the spline provided for the purpose in the body-forming horn. Otherwise the joint would be imperfect for the horns are sometimes inaccurately set. Therefore, the blanks must be guided a little to one side or the other so that the spline in the horn will properly lodge the meeting edges while the latter are being forced together.

At one side of the machine there is provided a casing or housing 90 secured to the table 4 by screws 91 or otherwise. Extending through the end portions of the housing 90 are shafts 92, 93, respectively, these shafts being spaced apart lengthwise of the machine sufficiently to bring them into operative relation to the notching and edging mechanisms, respectively. Each shaft 92, 93 has screw threads 94 thereon and is also provided with a continuation 95, 96, respectively, having screw threads 97 thereon, the screw threads 94 and 97 being respectively right and left hand threads and engaging threaded lugs 98 and 98ª, fast to the bars 8 and 9 through suitable slots in the table 4. The shafts 92, 93 carry sprocket wheels 99, 100, respectively, the two sprocket wheels being connected by a sprocket chain 101. The sprocket wheel 100 is made fast to the shaft 93 as by a pin 102 and the sprocket wheel 99 is so mounted on the shaft 92 as to be free to turn thereon under certain circumstances. The sprocket wheel 99 carries one member of a clutch 103 and the other member of said clutch has a manipulating part 104, which may be in the form of a knurled knob, slidable on the shaft 92 and provided with a set screw 105, whereby the two members of the clutch 103 may be brought into operative engagement or moved apart at the will of an operator.

Each shaft 92, 93 and its continuation 95, 96 is coupled together by a coupling sleeve 106 connected to the respective shafts and their continuations.

Mounted on the shafts 92, 93 are worm gears 107 free to rotate on the shafts and meshing with worms 108 upon another shaft 109 extending through the casing 90 and projecting through one end thereof where it has a hand wheel 110 applied thereto. Each worm gear 107 has a hub portion 111 threaded through a boss 112 formed on the casing 90, and exterior to the casing the shaft 92 has fast to it a hand wheel 113, while the shaft 93 has another hand wheel 114 fast to it, the hand wheel 113 having a milled periphery and the hand wheel 114 being provided with a crank 115.

The sprocket chain 101 is provided with a tightener device 116 of any suitable character extending through and accessible outside of the casing 90 and there provided with a nut 117, whereby the tightener may be held in adjusted positions, the casing 90 having a slot 118 through it to permit such adjustment.

The ends 95, 96 of the shafts 92, 93 extend through journal bearings 119 secured to the table 4 at appropriate points, the other ends of the shafts being carried by the casing or housing 90.

Extending through the flanges 13 are bolts 120 having heads movable along undercut slots 121 extending crosswise of the table 4. Lateral adjustment of the edger frames 124 and parts carrying and connected to them is permitted by tracks 124$^a$ along which the edger structures slide transversely of the machine. At the rear ends, the bars 8 and 9 have outturned upstanding flanges 123 which may be cast on or secured to said bars. Connected to the flanges 123 are edger frames 124, the connection being by means of bolts or screws 125 traversing said flanges. Also each flange 123 is traversed by a cam 126, which latter, when the bolts or screws 125 are loosened, may be utilized as a fine adjustment for the edger frames. The guide bars carrying the push or feed bars 45 and 48 are continued through the edger frame. Each edger frame 124 carries a slide 127 movable up and down in the frame and has a keeper 128. Each edger frame is also provided with a boss or lug 98$^a$ suitably threaded to pass the appropriate threaded portion of the screw 94 of the shaft 93 and its extension 96, whereby the opposite edger frames may be adjusted toward or from each other or in other ways which will presently be described.

To adjust the width of the notcher and the width of the edger simultaneously, the shaft 109 is rotated by means of the crank wheel 110. This causes the simultaneous rotation of the worms 108, and with them the simultaneous rotation of the worm gears 107. These worm gears 107 having the hubs 111 fast to them, cause the hubs to screw into or out of the bosses 112 through which they are threaded. This brings about a bodily longitudinal movement of the shafts 92 and 93 so that the edger and notcher mechanisms are moved bodily crosswise or transversely of the machine, such bodily movements being simultaneous.

When it is desired to vary the spacing between the opposite sides of the notcher or edger mechanisms, or both of them, either the hand wheel 113 or the hand wheel 114 is actuated with or without the clutch 103 in mesh. If the clutch 103 is meshing, a rotation of the hand wheel 113 causes a rotation of the sprocket wheel 99, and this in turn actuates the sprocket chain 101, driving the sprocket wheel 100, which is fast to the shaft 93, so that, under the circumstances considered, both shafts 92 and 93 rotate simultaneously and the edger and notcher mechanisms are spread or narrowed as the case may be. If it be desired to spread or narrow the edger only, the clutch 103 is released and the hand wheel 114 is manipulated so that the shaft 93 only is set in motion, and, because of the opening of the clutch 103, the shaft 92 is not actuated.

By means, therefore, illustrated in detail in Figs. 9 to 12, the notcher mechanisms may be spread or narrowed crosswise of the machine, or the edger mechanisms may be spread or narrowed crosswise of the machine.

At a point below the edger frames is a transverse shaft 129 mounted in journal bearings 130 carried by brackets 131 fast to and projecting forwardly from the rear frame 3 of the machine. The shaft 129 carries eccentrics 132 on opposite sides of the machine keyed to the shaft and each provided with a hub 133 also keyed to the shaft at the lower end and traversing bearings 134 at the lower end of arms 135 formed on the edger frames 124.

Projecting forwardly from one side of the upper end portion of the rear frame 3 is a post 136 on which is mounted a rocker arm or lever 137 projecting crosswise of the machine on each side of the post 136. One arm 138 of the lever 137 is pivoted to a slide 139 movable up and down between guides 140 fast on the front face of the rear frame 3 at an appropriate distance forwardly thereat. Carried by a link 138$^a$, depending from the arm 138 and guided by the slide 139, which slide is situated in substantially the upright central plane of the machine, is an arm 141 projecting on opposite sides of the mid-point thereof. In the arm 141 are oppositely directed slots 142 so situated as to be located over the two edger frames 124. At the upper end of each edger frame are upstanding ears 143 appropriately spaced apart and carrying between them an edger clamp lever 144 having an arm 145 pivoted by a pin 146, or otherwise, between the ears 143. Extending at approximately right angles to the arm 145 but in opposite directions therefrom are other arms 147 and 148, the arm 147 being pivotally carried by a block 149 slidable in a respective groove 142 in the arm 141.

The arms 148 of the two levers 144 carry steel blocks or strips 150, 151, the steel 150 having a beveled nose 152. Below the steel 150 is another steel 153 serving as a backing member against which the steel 150 clamps the corresponding edge of a can blank. The steel 151 is similar in effect to the steel 153 in acting as a backing block, while below the steel 151 is another steel 154 having at its upper end on one side thereof a nose 155 similar to the nose 152 on the steel or block 150 (see Fig. 20). Carried by the slide 127 of one of the edger frames or housings 124 is a lever 156 constituting part of a folder designed to bend over or fold the corresponding long edge of a can blank 71. The lever 156 is a substantially right angle lever with one arm 157 extended through the slide 127 to the upper end thereof and there formed into a head or heads 158 carrying a breaking steel 159, that is, a metal piece, usually steel, for sharply folding the metal of the can blank upon itself. This metal piece 159 is provided with a nose 160 directed toward the nose 152. The lever 156 is mounted on a pin 161 connected by a pitman 162 to an eccentric sleeve 163 enclosing the eccentric 132 on the shaft 129. The lever 156 has another arm 164 at right angles to the arm 157 and carrying a set screw 165 serving as a stop screw in the path of which there is located a bumper 166. The lever 156 has a short arm or lug on the side of the pivot pin 161 remote from the short arm 167, and in the path of this arm 167 is a set screw 168 carried by the slide 127.

In like manner the other slide 127 has a lever 169 pivoted thereon by a pin 170 connected by a pitman 171 with an eccentric strap 172 enclosing the other eccentric 132 on the shaft 129 but located on the opposite side of the machine. The lever 169 is provided with an upstanding arm 173 terminating at the upper end in a head or heads 174 carrying a breaking steel 175 provided with a transverse nose 176 adapted to cooperate with the nose 155 to bend the corresponding edge of a can blank toward the body of the blank but in the opposite direction to the bending of the first-mentioned edge of the can blank. In the path of a short arm or lug 177 of the lever 169 is a set screw 178 similar to the set screw 168, and the arm 173 of the lever 169 is provided with a substantially right angle arm 179 carrying a set screw 180 in position to engage a fixed part of the corresponding edger frame or housing.

Assuming that the can blank 71 is positioned in the edger structure with the clamp levers 144 and the folding levers 156 and 169 in the withdrawn or inoperative position, a rocking of the arms 137, 138 causes a movement of the clamp steels 150 and 151 into engagement with the opposite edge portions of the can blank 71 to hold these edges against the backing blocks 153 and 154. Then, the parts being properly timed, rotation of the shaft 129 causes a movement of the levers 156, 169 to swing the breaking steels 159 and 175, so that the noses 160 and 176 engage those edge portions of the blank 71 projecting from the clamp members holding them, whereupon these projecting portions of the blank are bent, one upwardly and other downwardly, into engagement with the other noses 152 and 155, so that the edge portions of the blank are brought into acute angular relation with respectively opposite faces of the body of the blank. Continued rotative movement of the shaft 129 thereupon moves the edger levers so as to release the edged blank for further progression through the machine.

Extending from opposite side posts of the rear frame 3 toward the upright central plane of the machine are brackets 181 spaced apart at their adjacent ends and there carrying parallel guides 182 between which is mounted a plate 183 carrying a horn 184 at its upper end, the horn being properly located to receive a can blank on its upper surface in position to be folded about the horn into cylindrical form for the engagement of the margins bent by the edger, and interlocking and hammering of the seam, which last operation may be performed in the usual manner. The horn is provided with a longitudinal spline or groove 185 to receive the seam joining the longitudinal meeting edges of the formed can body.

In order to fold the can blank around the horn, folding jaws 186 are pivoted on an axis longitudinal of the machine and are supported by a pendant stud 187 dropping from the crown of the rear frame 3, which frame is of arch form. The folding jaws 186 are each provided with a folding concavity or jaw 188 conforming to the shape of the can when completed and of suitable length. At the free or lower end of each jaw 186 is a locker plate or steel 189 shaped to force the folded-over meeting edges of the blank, when these meeting edges are brought together, into interlocking engagement, with the engaged edges in position to enter the spline 185.

On the face of the brackets 181 toward the rear of the machine are guides 190 for a slide 191 carrying a hammer tool 192 at the upper end and a journal bearing 193 near the lower end, such journal bearing carrying one end of a pitman 194, the other end of which is joined to a strap 195 engaging about a crank pin 196 in the countershaft 197. Provision is made for adjustment of the hammer 192 with reference to the horn by including a right and left nut 198 in the pitman 194, and securing the plate 183 carrying the horn 184 by means of screws 199 passing through elongated slots 200 in the plate 183.

The crank pin 196 is carried at the ends by disks 201 included in the countershaft 197 and the countershaft is mounted in bearings 202 near the ends. Beyond the bearings, the countershaft has pinions 203 fast thereto and these pinions are engaged by other pinions 204 on a main or power shaft 205 having journal bearings 206 in the rear frame 3 of the machine. A pulley 207 on the shaft 205 permits the application of power by means of a belt but it is to be understood that any other means of applying power to the machine may be employed.

In order to drive the shaft 43, meshing bevel pinions 208, 209 on the shafts 43 and 197, respectively, transmit power from the countershaft 197 to the drive shaft 43 for mechanism located in other parts of the machine.

On the shaft 43 near the pinion 208 is a cam 210 engaged by a roller 211 on one end of a rock arm or lever 212, the other end of which is connected by an adjustable pitman 213 to that arm of the lever 137 remote from the arm 138 thereof.

The rock arm 212 has fast to it one end of a spring 214, the other end of which is made fast at an appropriate point to the table 4 so that the spring imparts a constant tendency to the roller 212 to remain in engagement with the cam 210.

Underriding the disks 201 are cradle bearings 215, which only have to sustain a thrust caused by the rising engagement of the hammer 192 with a can seam lodged in the spline 185, return movements of the parts being taken care of by gravity.

Each jaw 186 is pivotally connected to a link or pitman 216 including a right and left hand screw threaded adjusting member 217 and is, at the end remote from the jaw, pivoted to a rock lever 218 mounted on a pintle 219 carried by the end 3 of the main frame. Connected to the end of the rock arm 218, remote from the link 216, is a rod 220 extended through the rear frame 3 to a wrist pin 221 on the gear wheel 203. The opposite ends of each rod 220 are connected by means of a universal joint structure 222 to the rock arm 218 and wrist pin 221, respectively. The universal joint structure 222 is a commercial article and is of a nature permitting the opposite ends of the rod 220 to move in different directions at the same time. This permits the lower end of the rod 220 to rock on the wrist pin 221 and at the same time at right angles to the length of the wrist pin, and the upper end of the rod to move through an arc of which the longitudinal axis of the pintle 219 constitutes the center. The universal bearings 222 are ball bearings and consequently of antifriction nature and have the advantage of small size but are capable of carrying relatively heavy loads so are far less bulky for the same capacity than ordinary ball and socket bearings.

Mounted on the shaft 197, between one of the bearings 202 and the gear wheel 203, is a sprocket wheel 223 connected by a sprocket chain 224 to another sprocket wheel 225 fast on the shaft 129. Both sprocket wheels 223 and 225, as well as the chain 224, are housed in a casing 226 formed as a split casing connected at the ends by bolts 227 permitting the ready application and removal of the casing when needed.

When the machine is in action, the operator feeds the can blanks, of which a supply is contained in the hopper 5, into the feed end of the machine, placing them between the wings 12 and down flat on the bars 45 and 48 reciprocating along the bars 6, 8 and 9. The reciprocatory movement of the feed bars 45 causes the dogs 46 to engage those edges of the blanks toward the operator and propel each blank as engaged toward the other or discharge end of the machine. Each complete feed movement is a double movement resulting in the long reciprocation of the feed bars 45 and 48, whereby each blank is propelled for a distance on each forward movement of the bars 45 and 48 a little less than a full operative movement of the blank and then the far shorter reciprocation of the bars 48ᵃ occurring immediately after the feeding movement of the bars 45 and 48 takes place, thus completing a full stroke of the blank. The first forward feed of the blank brings it to the entrance of the notcher zone so that the blank is then entered beneath the runners 86 and the gravity bar 75. At this point there is no operation performed upon the blank and the first feeding impulse is succeeded by a second one of like extent, which may be followed by a third impulse, such feeding impulse comprising the long movement and the short forward movement, as before. The last-named complete feeding impulse carries the blank into operative relation to the notcher zone, the parts being so timed that the notcher cutters 27 are then elevated. As soon as the feeding impulse carrying the blank into the proper position in the notcher zone has ceased, the notcher cams on the shaft 43 act simultaneously through the pitmen 32 to move the punches or cutters 27 down into engagement with the corners of the blank and clip off these corners, such operation occurring while the blank is held stationary by the gravity bar 75 and runners 86, the holding of the blank being wholly by friction.

The feeding of the blank through the machine then continues by further steps until the edging zone is reached, whereupon during the cessation of the movement of the blank while such blank with the corners already clipped off is located in the edging zone, the clamp members 150, 151 and the matching clamping members 153, 154 are brought into clamping relation to opposite faces of the blank close to but a little back of the margins of the blank to leave these margins projecting beyond the clamp. Coincident with such clamping movement of the parts, brought about by the cam 210, lever 212, pitman 213, rock lever 137, slide 139, arm 141 and levers 144, the folder levers 157, 173 are respectively raised and lowered and rocked by the shaft 129 and cams 132 thereon, so that one edge of the blank is bent upwardly and inwardly and the other edge of the blank is bent downwardly and inwardly, thus forming the opposite edges or margins of the blank for subsequent engagement and interlocking. Further movement of the mechanism removes the edger parts from engagement with the blank and a continuance of the feeding of the blanks further propels the edged blank from the edger zone on the horn where during a subsequent pause in the feeding of the blank, it is lodged on the horn 184 and embraced by the arms 186 actuated by the levers 218, rods 220 and pitman 216, causing the bending of the blank about the horn and the interlocking of the bent edges of the blank. As soon as the edges are interlocked, which occurs when these edges are located at the spline 185, the hammer 192 is moved against the interlocked edges to force them into close contact and into the spline 185, this being accomplished by the crank 196 on the shaft 197. The hammer and arms 186 are then withdrawn and the completed headless can body is engaged by the next blank in order and discharged from the machine as the subsequent blank reaches the horn 184.

What is claimed is:

1. In a can body forming machine, two reciprocatory mechanisms operating in succession, with the first mechanism having a forward feeding movement for each complete step of the feed of the blank through the machine less than the complete step, and the second mechanism having a forward movement representing but a small fractional portion of the forward movement of the first mechanism, whereby the major feed is performed by the first movement and overriding the feed due to momentum is avoided.

2. In a can body forming machine in which can blanks are intermittently fed through the machine by steps, a feeding mechanism comprising reciprocatory means for progressively moving the blank, during a complete feeding step, for a distance approaching but stopping short of the full feeding step, and other reciprocatory means movable in the same direction for completing the feeding movement and representing an extent of feed equalling the difference between the first movement and the complete full step of the feeding movement.

3. In a can-body forming machine, feeding devices for can blanks, means for causing a step by step progression of the feeding of the can blanks through the machine, and means for causing the step by step progression to include a relatively long step and an immediately following short step in the same direction, and for returning the feeding means participating in both steps to the initial position after each complete step, the second-named step representing but a small fractional portion of the length of the first step whereby the full feeding movement is accomplished in the two steps.

4. In a can body forming machine, reciprocatory feeding bars with can-blank engaging means thereon, means for reciprocating the bars to impart step by step progressive movements to the can blanks each of less extent than a full operative movement of a can blank, other reciprocatory bars and can-blank engaging means thereon associated with the first-named bars, and means for causing reciprocatory movements of the second-named bars for small fractional portions of the movements of the first-named bars with the second-named bars positioned and timed in movement to continue the feeding of the blanks to complete the full feeding strokes.

5. In a can body forming machine, separate reciprocatory feeding mechanisms for the can blanks, said mechanisms having driving means for operating them successively, one feeding mechanism having a stroke stopping short of the full stroke necessary for feeding a can blank to proper position and the other feeding mechanism having a short stroke immediately succeeding in time the cessation of the active stroke of the first feeding mechanism whereby the complete feed of the can blank during a full stroke is accomplished by a long and a short forward movement of the blank.

6. A can body forming machine having a course of travel for can blanks through the machine divided into zones of rest for the blanks, and means for propelling the blanks progressively through the course of travel, comprising reciprocatory bars with one-way engaging means for the can blanks, certain bars each having an extent of movement approximating but stopping short of the full length of travel of a blank from one zone to the next in order, and other bars having short reciprocatory movements for propelling the blanks the remainder of the full extent of movement imparted to the blanks in traveling from one zone to the next in order.

7. In a can body forming machine, a double-acting reciprocatory feeding mechanism for the can blanks engaging the latter successively, and the combined forward movement of the feeding mechanism representing the full forward movement thereof one mechanism having a stroke approximating but stopping short of the full feeding movement of a can blank, and the other continuing the feeding movement of the can blank to complete such movement and having a stroke representing but a small fractional part of the complete movement, whereby the full feeding movement is accomplished in two steps, with the second step too short to cause overriding of the can blank.

8. In a can body forming machine, a canbody-blank course having means for holding the blanks flat in their travel, and a plurality of reciprocatory members working in alternation, each with blank engaging devices and each movable actively in the same direction for propelling the blanks through the machine step by step, certain of the members having a range of movement to propel the blanks a distance approximating, but stopping short of, the full extent of one step of movement of the blank, and the other members propelling the blank for a short distance representing that necessary to complete a full step of movement of the blank when added to the longer initial step of movement thereof.

9. In a can body forming machine, means for imparting to the can body blanks step by step movements through the machine, comprising reciprocatory feeding members with blank-engaging means thereon, and long and short stroke actuating means for said members with the long stroke means connected to certain of the members to reciprocate the respective members to extents approximating but stopping short of the full movement of the can blank, and short stroke means connected to the other members and timed in action to continue the movement of the can blank to complete the full movement thereof, whereby the completing impulse imparted to the can blank is insufficient to cause the blank to override the intended limit of the full movement.

10. In a can body forming machine, means for imparting to the can body blanks step by step movements through the machine, comprising reciprocatory feeding members with blank-engaging means thereon, and long and short stroke actuating means for said members with the long stroke means connected to certain of the members to reciprocate the respective members to extents approximating but stopping short of the full movement of the can blank, and short stroke means connected to the other members and timed in action to continue the movement of the can blank to complete the full movement thereof, whereby the completing impulse imparted to the can blank is insufficient to cause the blank to override the intended limit of the full movement, said long and short stroke actuating means comprising a shaft, a crank disk thereon with a pitman carried by the crank disk and connected to the long stroke members, and a cam disk carried by the shaft with a pitman driven by the cam disk and connected to the other reciprocatory members.

11. In a can body forming machine, a runway for a succession of can blanks, means for feeding the blanks through the runway, a gravity bar overlying and engaging blanks progressing through the runway, and holding means for the gravity bar at the ends thereof.

12. In a can body forming machine, a runway for a series of can blanks, means for feeding the blanks through the runway, a gravity bar extending lengthwise of the runway intermediate of the sides thereof for resting upon the can blanks and holding them down in the runway, and supports for the gravity bar traversing the runway in overriding relation thereto and in which the ends of the gravity bar are loosely mounted to move freely up and down and to permit the bodily removal of the gravity bar from the machine.

13. In a can body forming machine, a runway for a series of can blanks, and supporting surfaces in the runway for the can blanks with longitudinally reciprocatory bars for feeding the blanks through the runway, said bars being located in the runway and spaced apart laterally, and a gravity bar extending lengthwise of the runway between the reciprocatory bars for substantially the full length of travel of the blanks through the machine to rest upon said can blanks passing through the runway to hold them against the supporting surfaces.

14. In a can body forming machine, a runway for a series of can blanks with supporting means for the blanks at the bottom of the runway, means in the runway for feeding the can blanks therealong, presser shoes or runners in the runway located adjacent to the side edges of the runway to there hold the blanks against the bottom of the runway, and a gravity bar for holding the blanks against the bottom of the runway and located intermediate of the width of the runway.

15. In a can body forming machine, means for feeding can blanks therethrough, a can-body-blank runway in which the blanks travel, elastically yieldable means for pressing down upon the blanks in the runway at the side portions of said blanks, and a readily removable gravity member in the runway extending lengthwise of the blanks for holding them in said runway intermediate of their width.

16. In a can body forming machine, a can-body-blank runway, means for feeding can blanks through the runway, holding down means for the blanks each comprising an elongated shoe or runner with stems at spaced points, a socket for each stem through which the latter extends, a spring in each socket engaging the shoe, a slide on and in offset relation to each socket, and elastic holding means for each slide whereby the shoe and parts connected thereto may be bodily secured to or removed from the machine at will.

17. In a can body forming machine, a can blank runway, means for feeding can blanks along the runway, means for holding can blanks down in the runway comprising elongated presser shoes or runners each with spaced stems therein, sockets through which the stems extend, springs housed in the sockets and tending to force the shoes against the can blanks, slides projecting from the sockets, and spring means in position to be underridden by the slides to hold the latter with the shoes bearing elastically against the blanks.

18. In a can body forming machine, a runway with side flanges, for a series of can body blanks, means for feeding the can blanks through the runway, presser shoes or runners in the runway adjacent to opposite sides thereof, each shoe extending lengthwise of the runway and provided with stems near opposite ends, a socket through which each stem extends, a spring in each socket surrounding the stem and bearing on the shoe, a slide projecting from each socket in overriding and engaging relation with the flange and movable therealong, and a leaf spring on the flange for bearing upon the slide to hold it on the flange, said shoe together with the slides and sockets being movable into and out of operative relation to the leaf spring to hold the shoe in place and to permit it to move away from the leaf springs to release it from the machine.

19. In a can body forming machine, a runway for can body blanks including a notcher mechanism for operating on the blanks passing through the runway, means for feeding can blanks along the runway, presser shoes for installation in the runway to hold the side edges of the blanks therein, and elastically yieldable carrying means for the shoes near opposite ends thereof and located in front of and to the rear of the notcher mechanism, said runway also having an elongated gravity bar extending lengthwise thereof to bear upon the body blanks intermediate of the width of the runway, and means for loosely supporting the gravity bar.

20. In a can body forming machine, a runway for can body blanks and means for feeding can blanks along the runway, a notcher mechanism for operating on the blanks passing through the runway, presser shoes for engaging the side edges of the blanks in their travel through the notcher mechanism, an edger mechanism in the runway succeeding the notcher mechanism and the presser shoes, and a gravity bar extending intermediately through both the parts of the runway occupied by the notcher and edger mechanisms.

21. In a can body forming machine, a runway for can blanks, means for feeding the can blanks along the runway, notcher mechanism and edger mechanism, for the blanks, spaced apart lengthwise of the runway, presser shoes on opposite sides of the runway within the margins thereof and extending from in front of the notcher mechanism to the rear thereof, said shoes having means for causing them to bear with elastic pressure on the side margins of can blanks passing through the runway, and a gravity bar extending from in front of the notcher mechanism to the rear of the edger mechanism and resting by gravity upon the can blanks in the runway intermediate of the sides of the latter.

22. In a can body forming machine, a runway for can blanks, means for feeding can blanks along the runway, notcher mechanism and edger mechanism, for the blanks, spaced apart lengthwise of the runway, presser shoes on opposite sides of the runway within the margins thereof and extending from the front to the rear of the notcher mechanism, said shoes having means for causing them to bear elastically on the side margins of the can blanks passing through the runway, and a gravity bar extending from in front of the notcher mechanism to the rear of the edger mechanism and resting by gravity upon the can blanks in the runway intermediate of the sides of the latter, said bar having holding means at the ends in the form of bridge pieces extending laterally across the runway.

23. In a can body forming machine, a runway for can blanks, means for feeding can blanks along the runway, notcher mechanism and edger mechanism, for the blanks, spaced apart lengthwise of the runway, presser shoes on opposite sides of the runway within the margins thereof and extending from in front of the notcher mechanism to the rear thereof, said shoes having means for causing them to bear with elastic pressure on the side margins of can blanks passing through the runway, and a gravity bar extending from in front of the notcher mechanism to the rear of the edger mechanism and resting by gravity upon the can blanks in the runway intermediate of the sides of the latter, said gravity bar having holding means at the ends in the form of bridge pieces extending laterally across the runway with loosely fitting connections between the bar and bridge pieces and from which bridge pieces the bar is readily removable.

24. In a can body forming machine, a runway for can body blanks, a notcher mechanism having reciprocatory tool carriers on opposite sides of the runway movable perpendicularly to the blanks to clip off the corners thereof, and means for reciprocating the tool carriers comprising an intermediately located rotatable shaft, oppositely-directed cams fast thereon, oppositely-directed rock arms carried and actuated by the cams, rock levers each connected to a rock arm and pivoted to move about a common axis on opposite sides thereof, and pitmen each pivoted to an intermediate part of a rock lever and in turn connected to a respective tool carrier, whereby both tool carriers are moved in the same direction at one time.

25. In a can body forming machine, a runway for can body blanks, a notcher mechanism having notching devices on opposite sides of the runway including tool carriers movable perpendicular to the blanks when located in the edger zone in position to clip off the corners of the blanks, and means for reciprocating the tool carriers comprising a rotatable shaft, cams on the shaft, rock arms carried and actuated by the cams and projecting oppositely therefrom, rock levers pivoted to move about a common axis and projecting to opposite sides of the shaft, and pitmen pivoted to the rock levers intermediate of the length thereof and in turn connected to the tool carriers, whereby the oppositely acting cams impart simultaneous movement to the pitmen and through the latter to the tool carriers in the same direction.

26. In a can body forming machine, a runway for can blanks, notcher mechanism on opposite sides of the runway for cutting off the corners of the blanks, and means for operating the notcher mechanisms comprising a pitman for each notcher mechanism, rock levers having a common axis of rocking, a rotatable shaft, oppositely-disposed cams on the shaft each with an arm connected to a respective rock lever at the end remote from the common axis, and connections between each pitman and a respective rock lever at a point intermediate of the length of the latter.

27. In a can body forming machine, a runway for can blanks, notcher mechanisms on opposite sides of the runway for removing the corners of the blanks, and means for operating the notcher mechanisms comprising a rotatable shaft, oppositely-directed cams on the shaft, arms each projecting from a respective cam and actuated thereby, angle rock levers having a common axis of rocking at one end of each shaft, with the other end of each lever pivoted to a respective one of the arms projecting from the cams, and pitmen on opposite sides of the shaft, each connected at one end to a respective notcher mechanism and at the other end to the intermediate angle portion of a respective angle rock lever.

28. In a can body forming machine, a runway for can blanks, notcher mechanisms for the can blanks on opposite sides of the runway, and means for the simultaneous bodily adjustment of the notcher mechanisms on both sides of the runway simultaneously toward one side or the other of the runway.

29. In a can body forming machine, a runway for can blanks, edger mechanisms for the can blanks located on opposite sides of the runway, and means for the simultaneous bodily adjustment of the edger mechanisms on both sides of the runway simultaneously toward one side or the other of the runway.

30. In a can body forming machine, a runway for can blanks, notcher mechanisms on the opposite sides of the runway, edger devices on the opposite sides of the runway and spaced from the notcher mechanisms in the direction of travel of the blanks through the runway, members connected to the notcher mechanisms for adjusting them laterally with respect to the runway, members connected to the edger mechanisms for adjusting them laterally with respect to the runway, and means connected to said members for causing the simultaneous adjustment of the notcher and edger mechanisms bodily toward one side or the other of the runway.

31. In a can body forming machine, a runway for can blanks, notcher mechanisms on opposite sides of the runway for engaging the can blanks in their travel through the runway, edger mechanisms on opposite sides of the runway for engaging the can blanks in their travel through the runway after leaving the notcher mechanisms, means connected to the notcher mechanisms and to the edger mechanisms for moving them laterally with respect to the runway, worm gears on said means with each worm gear provided with a screw-threaded hub, a nut for each screw-threaded hub, connected worms for engaging the worm gears to move them simultaneously, and manipulating means for actuating the connected worms whereby the notcher and edger mechanisms may be bodily adjusted laterally with respect to the longitudinal center line of the runway.

32. In a can body forming machine, a runway for can blanks, notcher mechanisms for the can blanks on opposite sides of the runway, edging mechanisms for the can blanks on opposite sides of the runway and spaced from the notcher mechanisms in the direction of travel of the can blanks along the runway, said notcher and edger mechanisms being provided with right and left hand nuts, a shaft for the notcher mechanisms having right and left hand screw threads traversing the nuts, a shaft for the edger mechanisms having right and left hand screw threads traversing the nuts, connections between the shafts for causing them to rotate simultaneously, means for connecting and disconnecting one of the shafts to and from the connections between the shafts, and manipulating means individual to the shafts.

33. In a can body forming machine, a runway for can blanks, notcher mechanisms for the can blanks on opposite sides of the runway, edger mechanisms for the can blanks on opposite sides of the runway and spaced from the notcher mechanisms in the direction of travel of the can blanks along the runway, said notcher and edger mechanisms being provided with right and left hand nuts, a shaft for the notcher mechanisms having right and left hand screw threads traversing the nuts, a shaft for the edger mechanisms having right and left hand screw threads traversing the nuts, connections between the shafts for causing them to rotate simultaneously, means for connecting and disconnecting one of the shafts to and from the connections between the shafts, and manipulating means individual to the shafts, the connections between the shafts comprising sprocket wheels individual to the shafts, and a sprocket chain connecting the sprocket wheels and one of the shafts being provided with a clutch and means whereby the clutch may be moved into and out of operation.

34. In a can body forming machine, a runway for can blanks, notcher mechanisms on opposite sides of the runway and adjustable toward and from each other laterally of the runway, edger mechanisms on opposite sides of the runway spaced from the notcher mechanisms in the direction of travel of the can blanks along the runway and adjustable toward and from each other, connecting devices between the notcher and edger mechanisms for permitting changes in the relation of the lateral adjustments of the notcher and edger mechanisms to each other, and a fine adjustment means for determining the minuteness of the relation between the lateral adjustment of the notcher and edger mechanisms.

35. In a can body forming machine, a runway for can blanks, notcher mechanisms on opposite sides of the runway and adjustable toward and from each other laterally of the runway, edger mechanisms on opposite sides of the runway spaced from the notcher mechanisms in the direction of travel of the can blanks along the runway and adjustable toward and from each other, connecting devices between the notcher and edger mechanisms for permitting changes in the relation of the lateral adjustments of the notcher and edger mechanisms to each other, and a fine adjustment means for determining the minuteness of the relation between the lateral adjustments of the notcher and edger mechanisms, said fine adjustment means including a cam and clamp screws.

36. In a can body forming machine, a double-acting one-way feeding mechanism for the can blanks with one mechanism having a stroke approximating but stopping short of the full feeding movement of a can blank and the other mechanism continuing the feeding movement of the can blank to complete such movement and having a stroke representing but a small fractional part of the complete movement, and means for causing the strokes comprising a reciprocable pitman and rotary crank for the longer stroke, and a cam member and connections therefrom to the feeding mechanism of shorter stroke, the mechanisms being timed in action to cause the strokes to occur in proper relation.

In testimony, that I claim the foregoing as my own, I have hereto affixed my signature in the presence of two witnesses.

GEORGE M. STEVENSON.

Witnesses:
W. H. H. STEVENSON,
H. C. OTTO.